(12) United States Patent
Williams

(10) Patent No.: US 11,242,021 B2
(45) Date of Patent: Feb. 8, 2022

(54) VEHICLES INCLUDING SWEEPER ASSEMBLIES FOR VEHICLE BUMPERS

(71) Applicant: TOYOTA MOTOR ENGINEERING & MANUFACTURING NORTH AMERICA, INC., Plano, TX (US)

(72) Inventor: Paxton S. Williams, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 104 days.

(21) Appl. No.: 16/870,711

(22) Filed: May 8, 2020

(65) Prior Publication Data
US 2021/0347319 A1    Nov. 11, 2021

(51) Int. Cl.
*B60J 7/00* (2006.01)
*B60R 19/48* (2006.01)
*B60S 1/66* (2006.01)

(52) U.S. Cl.
CPC ............ *B60R 19/48* (2013.01); *B60S 1/66* (2013.01)

(58) Field of Classification Search
CPC .......... B60R 9/06; B60R 19/34; B60R 19/48; B60R 19/52; B60R 2019/522; A61G 3/0808; A61G 5/04; B62D 21/15; C12N 2310/321; B60D 1/52
See application file for complete search history.

(56) References Cited

U.S. PATENT DOCUMENTS

| 4,570,986 | A  | * | 2/1986 | Sams | B60R 19/48 |
|---|---|---|---|---|---|
|   |   |   |   |   | 224/402 |
| 4,809,924 | A | * | 3/1989 | Martens | B60P 3/035 |
|   |   |   |   |   | 224/402 |
| 5,135,274 | A | * | 8/1992 | Dodd | B60R 11/06 |
|   |   |   |   |   | 224/491 |
| 5,364,142 | A | * | 11/1994 | Coiner | B60R 19/48 |
|   |   |   |   |   | 293/106 |
| 5,550,350 | A |   | 8/1996 | Barnes | |
| 6,140,609 | A |   | 10/2000 | Jones | |
| 6,196,612 | B1 | * | 3/2001 | Grimes | B60N 2/3011 |
|   |   |   |   |   | 293/117 |
| 6,659,525 | B2 | * | 12/2003 | Delavalle | B60R 5/041 |
|   |   |   |   |   | 296/26.08 |

(Continued)

FOREIGN PATENT DOCUMENTS

CN    104475311 A    4/2015
CN    204415307 U    6/2015
(Continued)

*Primary Examiner* — Kiran B Patel
(74) *Attorney, Agent, or Firm* — Dinsmore & Shohl LLP

(57) ABSTRACT

A vehicle includes a body, a rear bumper, and a sweeper assembly is provided. The body has a forward end, a rear end, and a cavity provided therein extending in a vehicle longitudinal direction. The cavity has an opening at the rear end of the body. The rear bumper has an upper surface and is provided at the rear end of the body of the vehicle. The sweeper assembly includes a push plate movable between a retracted position and an extended position. The push plate is stored within the cavity of the body when in the retracted position and extends over the upper surface of the rear bumper when in the extended position to clear debris off the upper surface of the rear bumper.

13 Claims, 7 Drawing Sheets

(56) References Cited

U.S. PATENT DOCUMENTS

| | | | |
|---|---|---|---|
| 6,827,377 B2 * | 12/2004 | Ferrigan | B60D 1/075 |
| | | | 293/117 |
| 6,840,554 B2 * | 1/2005 | Ferrigan | B60D 1/075 |
| | | | 224/512 |
| 6,896,303 B1 * | 5/2005 | Mohr | B60D 1/06 |
| | | | 293/117 |
| 6,926,322 B2 * | 8/2005 | Browne | B60R 19/40 |
| | | | 293/114 |
| 7,044,487 B2 | 5/2006 | Byrne | |
| 7,326,894 B2 | 2/2008 | Meiler et al. | |
| 7,607,705 B1 * | 10/2009 | Mast | B60R 19/483 |
| | | | 293/102 |
| 7,921,502 B1 | 4/2011 | Valverde | |
| 8,087,122 B2 * | 1/2012 | Martin | B60S 1/603 |
| | | | 15/250.002 |
| 8,393,657 B1 * | 3/2013 | Duderstadt | B60N 3/023 |
| | | | 293/117 |
| 9,802,545 B1 | 10/2017 | Salter et al. | |
| 9,931,987 B2 * | 4/2018 | Baeza | B60R 3/007 |
| 9,981,516 B1 * | 5/2018 | Alvarez | B60D 1/06 |
| 10,232,830 B2 | 3/2019 | Frederick et al. | |
| D878,283 S * | 3/2020 | Ewing | D12/561 |
| 2004/0217573 A1 * | 11/2004 | Foster | B60R 9/06 |
| | | | 280/166 |
| 2008/0277950 A1 * | 11/2008 | Nees | B60R 19/48 |
| | | | 293/106 |
| 2011/0099858 A1 | 5/2011 | Jakus et al. | |
| 2012/0043773 A1 * | 2/2012 | Lucas | B60R 19/48 |
| | | | 293/106 |
| 2018/0162305 A1 * | 6/2018 | Shen | B60R 19/48 |
| 2020/0022225 A1 | 1/2020 | Dellock et al. | |
| 2020/0156549 A1 * | 5/2020 | DeBerti | B60R 19/48 |

FOREIGN PATENT DOCUMENTS

| | | |
|---|---|---|
| CN | 204452242 U | 7/2015 |
| CN | 208484657 U | 2/2019 |
| DE | 102012009747 A1 | 11/2013 |
| DE | 102017204975 A1 | 9/2018 |
| IN | 4409CH2015 A | 9/2015 |
| JP | 3862991 B2 | 12/2006 |
| KR | 101608081 B1 | 4/2016 |
| KR | 101836708 B1 | 3/2018 |
| RU | 2584642 C1 | 5/2016 |
| WO | 2012079682 A1 | 6/2012 |
| WO | 2019073975 A1 | 4/2019 |

* cited by examiner

VEHICLES INCLUDING SWEEPER ASSEMBLIES FOR VEHICLE BUMPERS

TECHNICAL FIELD

The present specification generally relates to cleaning assemblies for vehicles and, more specifically, cleaning assemblies for rear bumpers of vehicles.

BACKGROUND

Rear bumpers of vehicles are prone to accumulating debris over time that may harm the paint on the vehicle. For example, it is very common for snow to accumulate on an upper surface of the rear bumper of a vehicle. This snow can harden as temperatures lower and become very difficult to remove from the vehicle. Similarly, dirt, mud, and gravel can accumulate on a bumper during off-road use. When a tailgate of the vehicle, such as a truck, is opened manually, failure to observe and remove the accumulated material prior to opening the tailgate can cause contact between the sheet metal or paint on an exterior surface of the tailgate and the debris. Moreover, when the tailgate is opened automatically, a sensor may be provided to detect the object below the tailgate and stop the tailgate from opening. However, the reaction to stop movement of the tailgate may be delayed until after contact with the debris.

Accordingly, a need exists for improved cleaning assemblies for cleaning an upper surface of a rear bumper of a vehicle.

SUMMARY

In one embodiment, a vehicle includes a body, a rear bumper, and a sweeper assembly. The body has a forward end, a rear end, and a cavity provided therein extending in a vehicle longitudinal direction. The cavity has an opening at the rear end of the body. The rear bumper has an upper surface and is provided at the rear end of the body of the vehicle. The sweeper assembly includes a push plate movable between a retracted position and an extended position. The push plate is stored within the cavity of the body when in the retracted position and extends over the upper surface of the rear bumper when in the extended position to clear debris off the upper surface of the rear bumper.

In some embodiments, the vehicle includes a tailgate positionable between an open position and a closed position, and the sweeper assembly is operable when the tailgate is in the closed position. Thus, debris, such as ice, dirt, and the like, accumulating on the upper surface of the rear bumper may be pushed off the rear bumper prior to the tailgate opening and contacting the debris on the upper surface of the rear bumper.

In some embodiments, the push plate has a geometry configured to extend along substantially an entire portion of the upper surface of the rear bumper. In addition, the sweeper assembly may be configured to operate the push plate upon a condition being satisfied such as, for example, a vehicle start operation or an outside temperature exceeding a predetermined threshold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a vehicle that includes one or more debris cleaning assemblies for cleaning debris such as, for example, ice, dirt, mud, and the like, off an upper surface of a rear bumper of the vehicle. As such, the vehicle includes the debris cleaning assembly that may include one or a combination of a sweeper assembly, a sprayer assembly, and/or a heater assembly. As discussed herein, each of the sweeper assembly, the sprayer assembly, and the heater assembly may be provided on a single vehicle and operated individually or in combination with one another to clear debris off the upper surface of the rear bumper.

Figure 1:
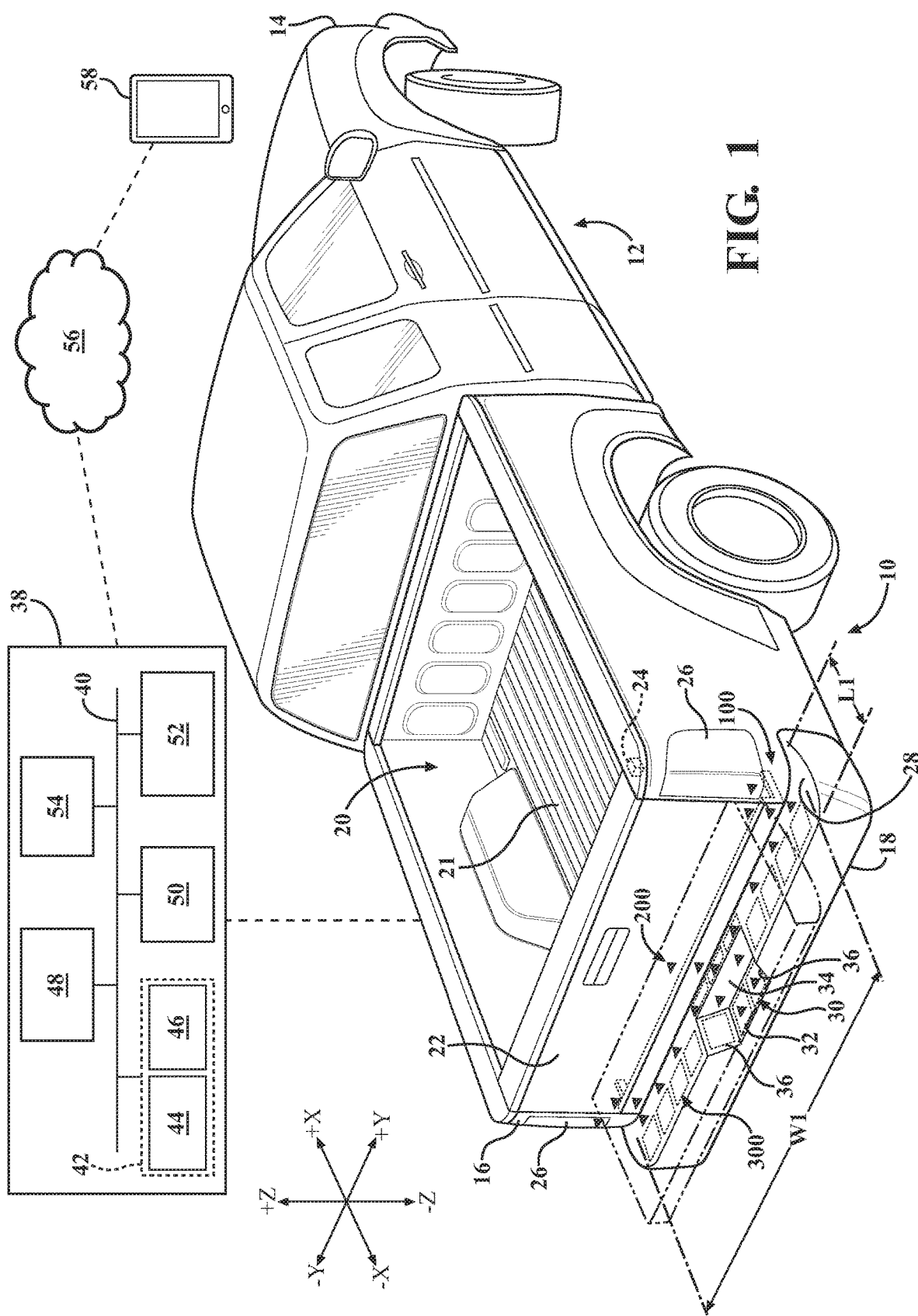
FIG. 1 schematically depicts a perspective view of a vehicle including a sweeper assembly, a sprayer assembly, and a heater assembly according to one or more embodiments shown and described herein.

As used herein, the term "vehicle longitudinal direction" refers to the forward-rearward direction of the vehicle (i.e., in the +/−vehicle X direction depicted in FIG. 1). The term "vehicle lateral direction" refers to the cross-vehicle direction (i.e., in the +/−vehicle Y direction depicted in FIG. 1), and is transverse to the vehicle longitudinal direction. The term "vehicle vertical direction" refers to the upward-downward direction of the vehicle (i.e., in the +/−vehicle Z direction depicted in FIG. 1). As used herein, "upper" and "above" are defined as the positive Z direction of the coordinate axis shown in the drawings. As used herein, "lower" and "below" are defined as the negative Z direction of the coordinate axis shown in the drawings.

Various embodiments of the vehicle and the operation of the vehicle are described in more detail herein. Whenever possible, the same reference numerals will be used throughout the drawings to refer to the same or like parts.

Referring now to FIG. 1, a vehicle 10 is generally illustrated according to one or more embodiments described herein. As shown, the vehicle 10 is illustrated as a pickup truck. However, the vehicle 10 may be any suitable automobile including coupes, sedans, minivans, crossovers, hybrids, sports utility vehicles, or the like without limiting the scope of the present disclosure. The vehicle 10 includes a body 12 having a front end 14 and a rear end 16, and a rear bumper 18 provided at the rear end 16 of the body 12 of the vehicle 10. The rear bumper 18 has a bumper width W1 extending in the vehicle lateral direction and a bumper length L1 extending in the vehicle longitudinal direction from the body 12 of the vehicle 10. In some embodiments, the body 12 of the vehicle 10 includes a bed 20 on the body 12 of the vehicle 10 and between the front end 14 and the rear end 16 of the body 12. The bed 20 includes a floor 21 and a tailgate 22 operable between a closed position and an open position to provide access into the bed 20 at the rear end 16 of the body 12 of the vehicle 10. In some embodiments, the vehicle 10 includes a sensor 24 provided on the body 12 of the vehicle 10 or the tailgate 22 for detecting whether the tailgate 22 is in the closed position or the open position. The vehicle 10 includes a pair of light assemblies 26 arranged on opposite sides of the vehicle 10 adjacent the tailgate 22.

In some embodiments, the rear bumper 18 has an upper surface 28 and at least one step 30 formed in the upper surface 28 of the rear bumper 18. The step 30 may be provided at any suitable location of the rear bumper 18 allowing a user to step onto the rear bumper 18 and access a top of the vehicle 10 or the bed 20 of the vehicle 10. The step 30 includes a bottom wall 32, a forward wall 34, and a pair of sidewalls 36. The forward wall 34 and the pair of sidewalls 36 extend between the bottom wall 32 and the upper surface 28 of the rear bumper 18. As shown, the step 30 is formed in the upper surface 28 of the rear bumper 18 at a central location in the vehicle lateral direction. However, the location of the step 30 provided in the present disclosure is for illustrative purposes only and other embodiments may provide a pair of steps 30 formed proximate opposite sides of the rear bumper 18 in the vehicle lateral direction or a plurality of steps without deviating from the scope of the present disclosure.

As shown in FIG. 1, in some embodiments, the vehicle 10 includes an onboard computing device 38 including a communication path 40, an electronic control unit 42 including a processor 44 and a memory module 46, a transceiver 48, input/output hardware 50, a temperature sensor 52, and network interface hardware 54. The various components of the vehicle 10 and the interaction thereof will be described in detail below.

In some embodiments, a network 56 couples the vehicle 10 to a mobile computing device 58. The network 56 may include a wide area network, such as an internet or cellular network (such as 3G, 4G, 4G LTE, WiMAX, etc.). Similarly, the network 56 may include a local area network, such as a wireless fidelity (Wi-Fi) network, a Bluetooth network, a near field communication network, hardware, and the like.

The mobile computing device 58 may be configured as a mobile phone, a tablet, a personal computer, and/or other devices for performing the functionality described herein. The mobile computing device 58 may be operated by a third party such as a driver or other occupant or owner of the vehicle 10.

The communication path 40 may be formed from any medium that is capable of transmitting a signal such as, for example, conductive wires, conductive traces, optical waveguides, or the like. Moreover, the communication path 40 may be formed from a combination of mediums capable of transmitting signals. In one embodiment, the communication path 40 comprises a combination of conductive traces, conductive wires, connectors, and buses that cooperate to permit the transmission of electrical data signals to components such as processors, memories, sensors, input devices, output devices, and communication devices. Accordingly, the communication path 40 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 40 communicatively couples the various components of the vehicle 10. As used herein, the term "communicatively coupled" means that coupled components are capable of exchanging data signals with one another such as, for example, electrical signals via conductive medium, electromagnetic signals via air, optical signals via optical waveguides, and the like.

The processor 44 of the electronic control unit 42 may be any device capable of executing machine-readable instructions. Accordingly, the processor 44 may be a controller, an integrated circuit, a microchip, a computer, or any other computing device. The processor 44 may be communicatively coupled to the other components of the vehicle 10 by the communication path 40. Accordingly, the communication path 40 may communicatively couple any number of processors with one another, and allow the components coupled to the communication path 40 to operate in a distributed computing environment. Specifically, each of the components may operate as a node that may send and/or receive data. While the embodiment depicted in FIG. 1 includes a single processor 44, other embodiments may include more than one processor 44.

The memory module 46 of the electronic control unit 42 is coupled to the communication path 40 and communicatively coupled to the processor 44. The memory module 46 may comprise RAM, ROM, flash memories, hard drives, or any non-transitory memory device capable of storing machine-readable instructions such that the machine-readable instructions can be accessed and executed by the processor 44. The machine-readable instructions may comprise logic or algorithm(s) written in any programming language of any generation (e.g., 1GL, 2GL, 3GL, 4GL, or 5GL) such as, for example, machine language that may be directly executed by the processor 44, or assembly language, object-oriented programming (OOP), scripting languages, microcode, etc., that may be compiled or assembled into machine-readable instructions and stored in the memory module 46. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single memory module 46, other embodiments may include more than one memory module 46.

The transceiver 48 is in electrical communication with the electronic control unit 42. The transceiver 48 is configured for two-way communication with the network 56 to couple the vehicle 10 to the network 56 and, thus, the mobile computing device 58. The transceiver 48 may communicate directly with other external devices, such as a key fob or the like via Bluetooth or other near field communication protocols.

The temperature sensor 52 is coupled to the communication path 40 and communicatively coupled to the processor 44. The temperature sensor 52 may be any device capable of outputting a temperature signal indicative of a temperature sensed by the temperature sensor 52. In some embodiments, the temperature sensor 52 may include a thermocouple, a resistive temperature device, an infrared sensor, a bimetallic device, a change of state sensor, a thermometer, a silicon diode sensor, or the like.

The input/output hardware 50 may refer to a basic input/output system (BIOS) that interacts with hardware of the vehicle 10, the mobile computing device 58, drivers that interact with particular devices of the vehicle 10 or the mobile computing device 58, one or more operating systems, user applications, background services, background applications, etc. In some embodiments, the input/output hardware 50 includes a display unit, a user interface, and/or the other hardware in the vehicle 10. The user interface may include manual buttons or touchscreen controls provided on the display unit.

The network interface hardware 54 may include or be configured to interface with the transceiver 48 to connect the vehicle 10 to the network 56. As an example, the network interface hardware 54 is operable to communicate with any wired or wireless network hardware, including an antenna, a modem, a LAN, wireless fidelity (Wi-Fi) card, WiMAX card, mobile communications hardware, and/or other hardware for communicating with other networks and/or devices. From this connection, communication is made through the transceiver 48 using the network interface hardware 54 thereby facilitating communication between the electronic control unit 42 and the mobile computing device 58 through the network 56.

As shown in FIG. 1, an embodiment of the vehicle 10 generally includes a sweeper assembly 100, a sprayer assembly 200, and a heater assembly 300. However, it is to be appreciated that embodiments of the vehicle 10 may include only one of the sweeper assembly 100, the sprayer assembly 200, and the heater assembly 300 while other embodiments of the vehicle 10 may include any combination of the sweeper assembly 100, the sprayer assembly 200, and the heater assembly 300. The sweeper assembly 100, the sprayer assembly 200, and the heater assembly 300 may each communicate with the onboard computing device 38 of the vehicle 10 to operate in conjunction with one another, when provided, as described in more detail herein.

Figure 2:
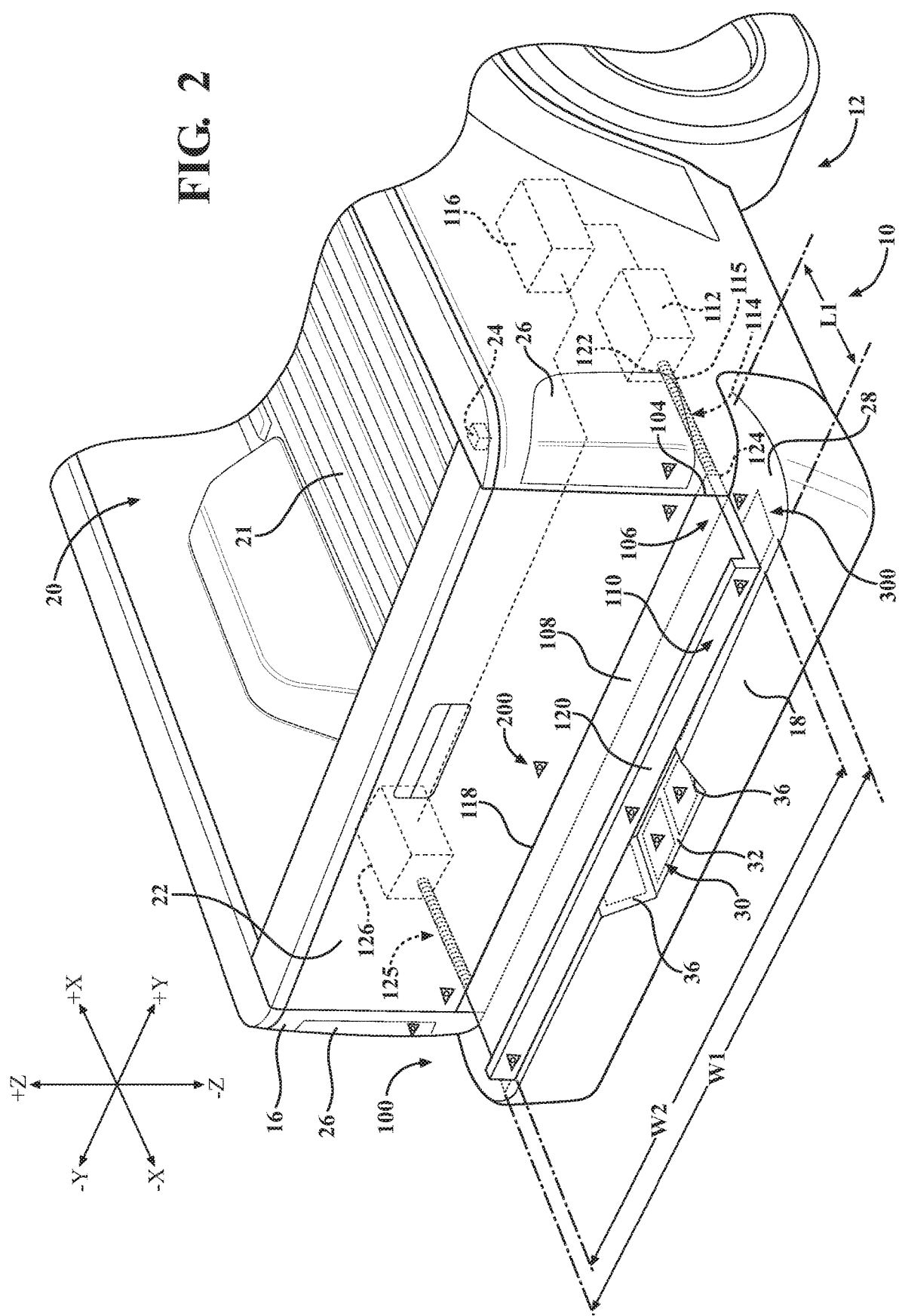
FIG. 2 schematically depicts a partial perspective view of the vehicle showing the sweeper assembly in an extended position according to one or more embodiments shown and described herein.
Figure 3:
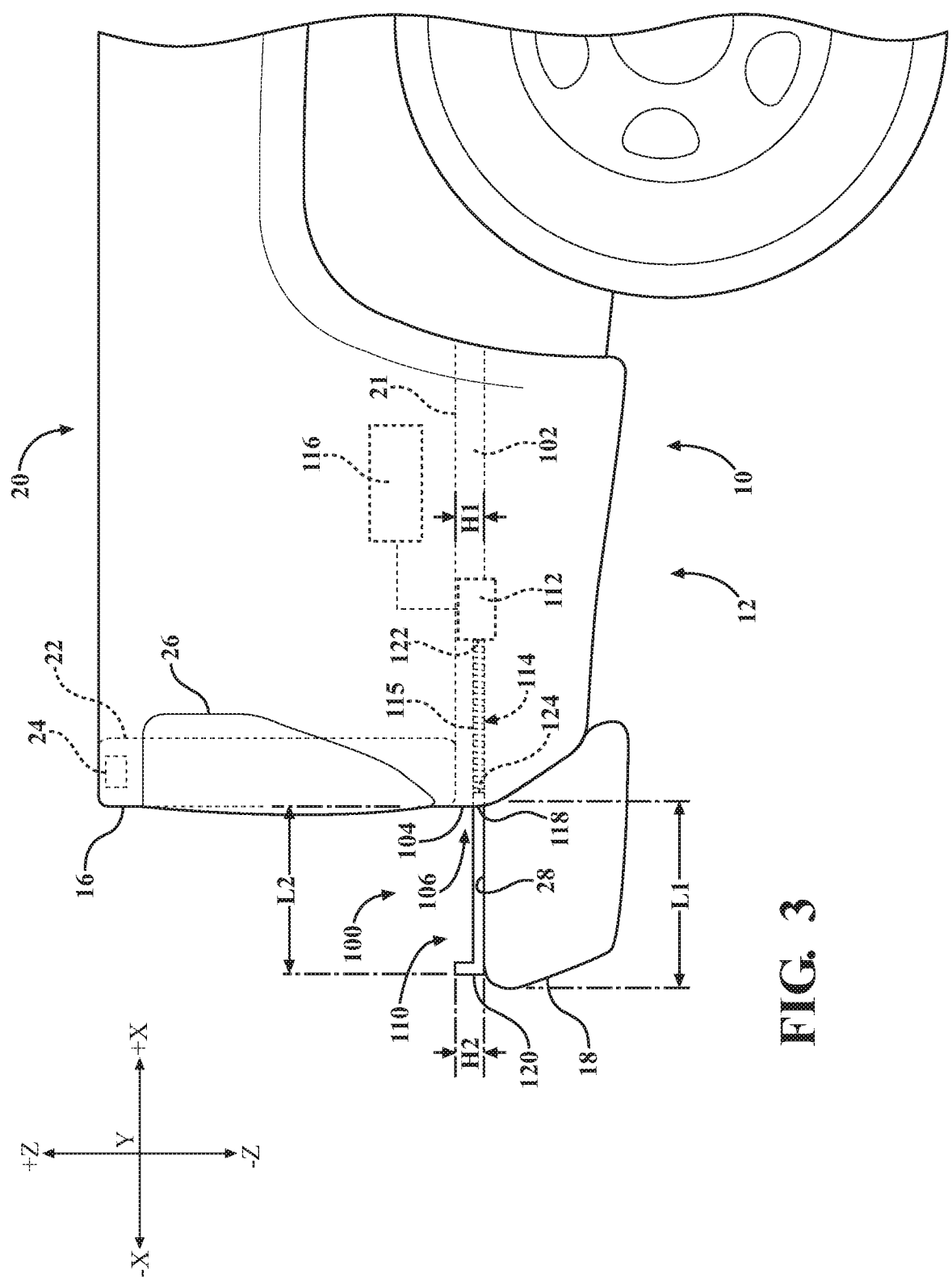
FIG. 3 schematically depicts a partial side view of the vehicle showing the sweeper assembly in the extended position and a tailgate in a closed position according to one or more embodiments shown and described herein.
Figure 4:
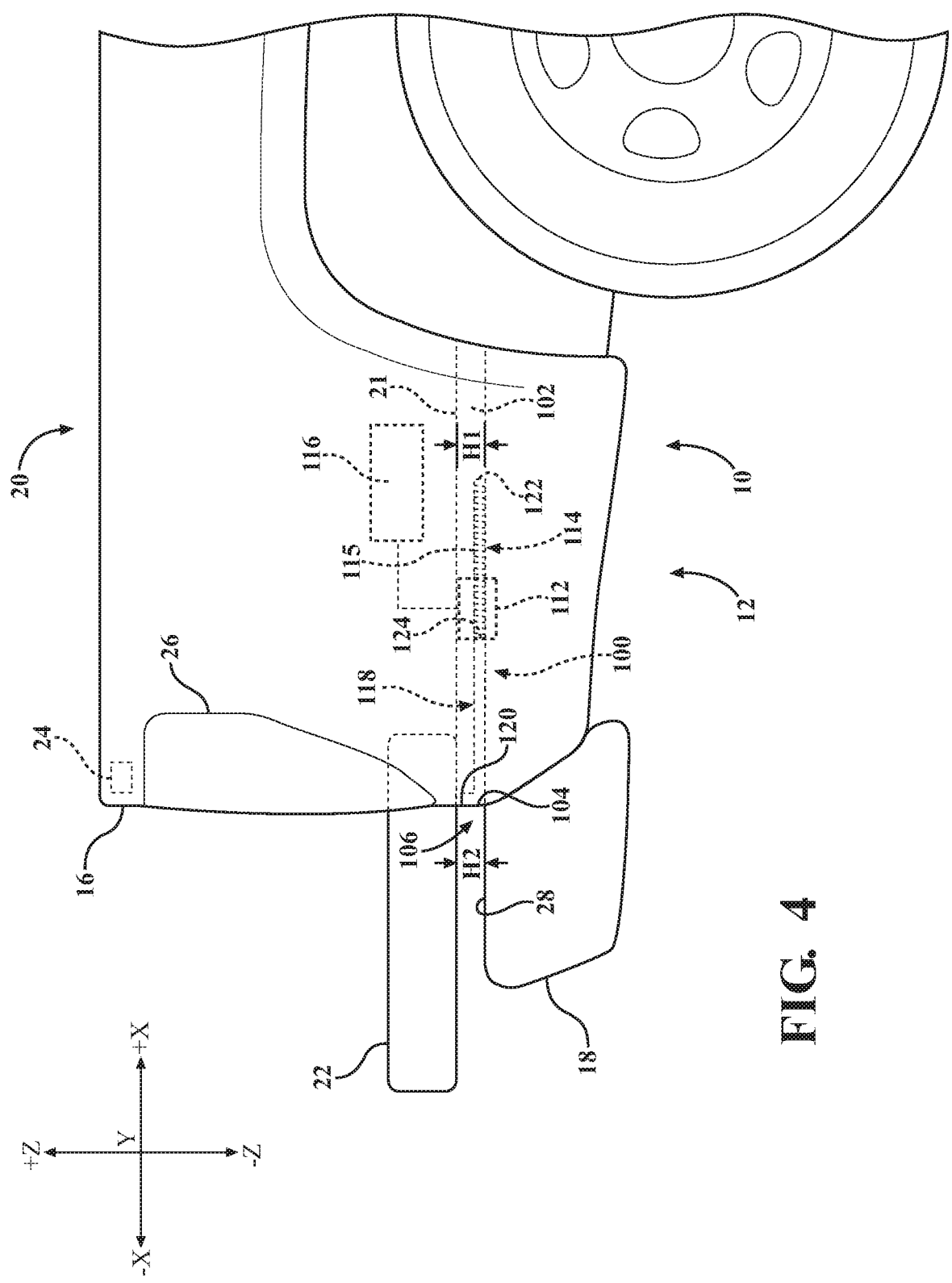
FIG. 4 schematically depicts a partial side view of the vehicle showing the sweeper assembly in a retracted position and the tailgate in an open position according to one or more embodiments shown and described herein.

Referring now to FIGS. 2-4, in some embodiments, the vehicle 10 includes the sweeper assembly 100 and a cavity 102 formed within the body 12 of the vehicle 10 and below the floor 21 of the bed 20 of the vehicle 10, when provided, in which the sweeper assembly 100 may be at least partially and temporarily stowed. At a rear end 104 of the cavity 102, proximate the tailgate 22, an opening 106 is provided with an opening height H1 extending between a lower edge 108 of the tailgate 22 and the upper surface 28 of the rear bumper 18. The opening 106 allows for the sweeper assembly 100 to extend out of the cavity 102 during operation, as discussed in more detail herein.

The sweeper assembly 100 generally includes a push plate 110, a motor 112, a base member 114 engaging the motor 112 and coupled to the push plate 110, and a power source 116 for operating the motor 112. It should be appreciated that the power source 116 of the sweeper assembly 100, such as a battery, may be the same power source used by the vehicle 10 or may be a separate power source.

The push plate 110 is configured to move in the vehicle longitudinal direction, i.e., +/−X direction. As shown in FIGS. 2 and 3, the tailgate 22 is in the closed position and upright relative to the vehicle vertical direction, and the push plate 110 is in an extended position over the upper surface 28 of the rear bumper 18. As shown in FIG. 4, the tailgate 22 is in the open position and parallel to the upper surface 28 of the rear bumper 18, and the push plate 110 is in a retracted position and stowed below the floor 21 of the bed 20 of the vehicle 10.

As shown in FIG. 2, the push plate has a push plate width W2, a push plate height H2, and a push plate length L2. The push plate width W2 and the push plate length L2 may be equal to the bumper width W1 and the bumper length L1, respectively, such that the push plate 110 is capable of pushing debris off substantially an entire portion of the upper surface 28 of the rear bumper 18.

In some embodiments, the push plate 110 is an L-shaped member, as shown. However, the push plate 110 may include any geometry suitable for pushing debris in the −X direction or directing debris off the rear bumper 18 in the vehicle lateral direction such that debris is pushed off the upper surface 28 of the rear bumper 18 as the push plate 110 moves in the −X direction toward the extended position.

As shown in FIGS. 2-4, in some embodiments, the push plate 110 has a forward end 118 and an opposite rear end 120. The rear end 120 may be flared upward in the vehicle vertical direction to provide additional height at the rear end 120, which may be used to move a greater amount of debris compared to a flat plate alone. Additionally, the rear end 120 may be formed of any suitable material such as a plastic, rubber, etc. Combinations of materials may also be used. The base member 114 has a forward end 122 and an opposite rear end 124. The rear end 124 of the base member 114 is coupled to the forward end 118 of the push plate 110 and the forward end 122 of the base member 114 engages the motor 112 to move the push plate 110 between the retracted position and the extended position.

In one embodiment, the rear end 124 of the base member 114 may be fixed to the push plate 110 and the base member 114 may include a threaded rod 115 at the forward end 122 of the base member 114 for threadedly engaging the motor 112. Thus, actuation of the motor 112 in a first direction engages the threaded rod 115 of the base member 114 to move the base member 114 in the −X direction, thereby moving the push plate 110 toward the extended position. Similarly, actuation of the motor 112 in an opposite second direction may engage the threaded rod 115 of the base member 114 to move the base member 114 in the +X direction, thereby moving the push plate 110 toward the retracted position. It should be appreciated that the operation of the base member 114 and the motor 112 discussed above is a non-limiting example and other methods of moving the push plate 110 between the retracted position and the extended position are within the scope of the present disclosure. For example, the motor 112 and the base member 114 may include a rack and pinion gear, or a linear actuator operable to translate the push plate 110 in the vehicle longitudinal direction. In some embodiments, as shown in FIG. 2, the motor 112 may be provided proximate one side of the body 12 of the vehicle 10 and engaging the base member 114 and a second motor 126 may be provided on an opposite side of the body 12 of the vehicle 10 for engaging a second base member 125. The motors 112, 126 may each engage the respective base members 114, 125 for distributing the force of translating the base members 114, 125 and the push plate 110.

As shown in FIG. 4, in some embodiments, the push plate height H2 is equal to the opening height H1 of the cavity 102. As such, when the push plate 110 is in the retracted position, the push plate 110 conceals the opening 106 of the cavity 102. This prevents debris from entering the cavity 102 when the push plate 110 is not operated and in the retracted position.

The sweeper assembly 100 may be manually operated and/or automatic. Thus, the motor 112 or the power source 116 of the sweeper assembly 100 may be in communication with the onboard computing device 38. When operating manually, the sweeper assembly 100 may be operated by engaging the user interface of the input/output hardware 50 or by receiving instruction from a device, such as the mobile computing device 58, via the network 56 or the transceiver 48.

When operating automatically, the onboard computing device 38 may be configured to operate the sweeper assembly 100 when a predetermined condition is satisfied. The predetermined condition may be at least one or a combination of the tailgate 22 being in the closed position, as detected by the sensor 24, the vehicle 10 being started, and the temperature sensor 52 determining that an outside temperature is below or above a predetermined threshold. As a non-limiting example, the onboard computing device 38 may instruct the sweeper assembly 100 to operate upon a vehicle start operation being detected. The onboard computing device 38 may instruct the sweeper assembly 100 to move from the initial retracted position to the extended position and back either one time, a predetermined number of times, or for a predetermined period of time. In another non-limiting example, the onboard computing device 38 may instruct the sweeper assembly 100 to operate in response to a vehicle start operation being detected and the temperature sensor 52 detecting that the outside temperature is above a predetermined temperature. Actuating the sweeper assembly 100 when the outside temperature is above a predetermined threshold reduces the risk of the sweeper assembly 100 engaging hard debris such as ice before the ice melts.

Figure 5:
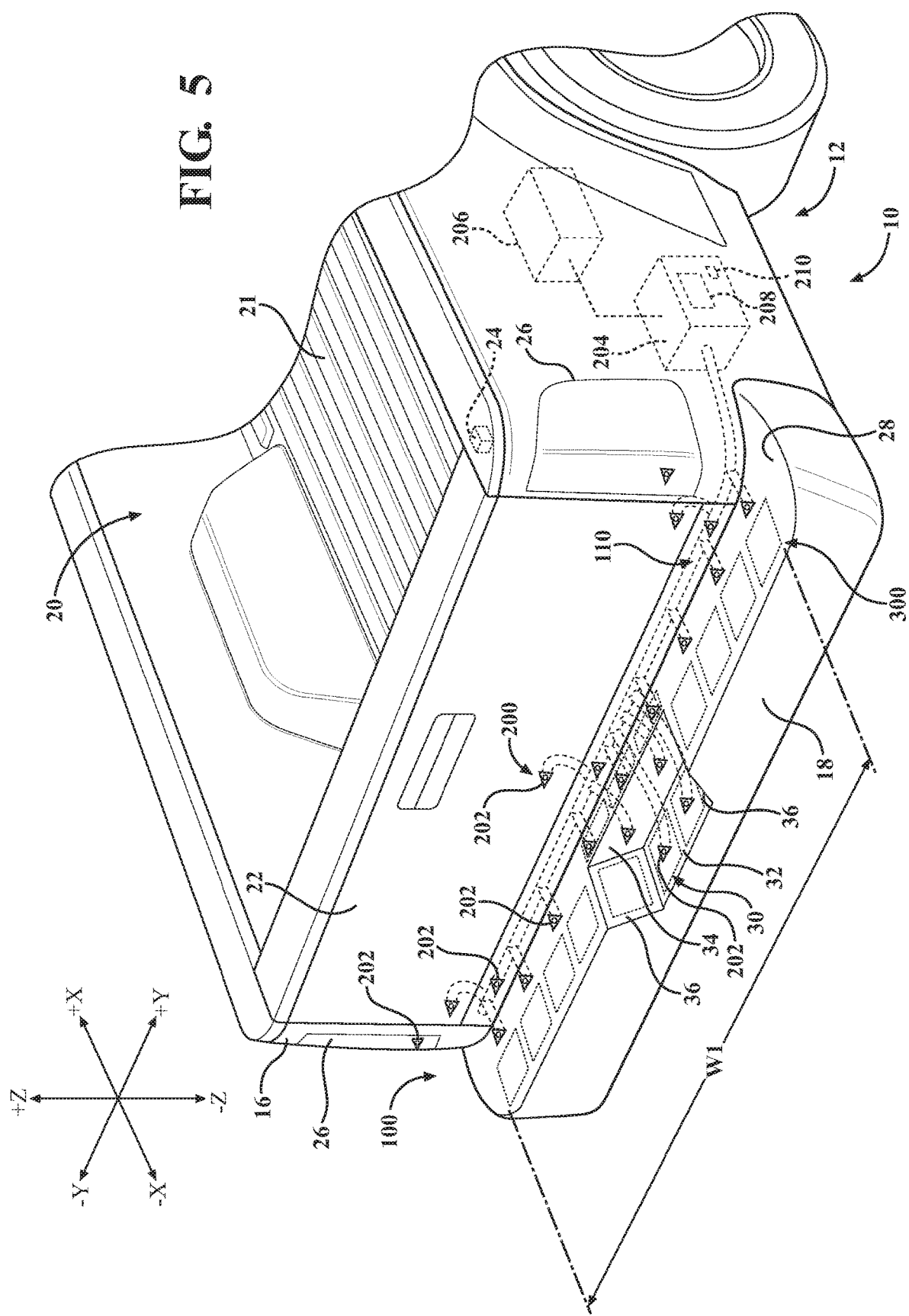
FIG. 5 schematically depicts a partial perspective view of the vehicle including a plurality of nozzles of the sprayer assembly according to one or more embodiments shown and described herein.

Referring now to FIG. 5, an embodiment of the vehicle 10 is shown including the sprayer assembly 200. The sprayer assembly 200 includes a plurality of nozzles 202, a fluid reservoir 204 in fluid communication with the plurality of nozzles 202, and a power source 206. It should be appreciated that the power source 206 of the sprayer assembly 200, such as a battery, may be the same power source used by the sweeper assembly 100, if provided, and/or the vehicle 10, or may be a separate power source. The fluid reservoir 204 houses fluid such as, for example, water or any other suitable washing or cleaning solution and may include a deicer or other suitable solution that can be used to move debris. In some embodiments, the fluid reservoir 204 will be configured to emit compressed air through the nozzles 202. In some embodiments, the fluid reservoir 204 includes a pump 208 activated by the power source 206 in order to direct the fluid within the fluid reservoir 204 toward the plurality of nozzles 202. The fluid reservoir 204 may also include a heater 210 for heating the fluid stored within the fluid reservoir 204 prior to being sprayed by the nozzles 202.

The plurality of nozzles 202 are configured to direct a spray of fluid from the fluid reservoir 204 onto the upper surface 28 of the rear bumper 18 to wash debris off the upper surface 28. In some embodiments, the nozzles 202 may be provided on the upper surface 28 of the rear bumper 18 and spaced apart from one another. More particularly, the nozzles 202 may be equidistantly spaced apart from one another along the bumper width W1. By spacing the nozzles 202 apart from one another along the bumper width W1 of the rear bumper 18, a substantial portion of the upper surface 28 of the rear bumper 18 may be sprayed with the fluid. As shown, in some embodiments, nozzles 202 are provided within the step 30 on the forward wall 34 and the sidewalls 36 to spray fluid onto the bottom wall 32 of the step 30.

It should be appreciated that the nozzles 202 may be provided at other locations on the vehicle 10 in addition to those provided on the upper surface 28 of the rear bumper 18 or in lieu thereof and configured to direct the fluid onto the upper surface 28 of the rear bumper 18. For example, as shown in FIG. 5, a plurality of nozzles 202 are provided on the tailgate 22 proximate the lower edge 108 thereof. Additionally, a plurality of nozzles 202 are shown on the push plate 110 of the sweeper assembly 100, if provided, and the light assemblies 26 on opposite sides of the tailgate 22. Similar to the nozzles 202 discussed above provided on the rear bumper 18, the nozzles 202 provided on the tailgate 22, the push plate 110, and the light assemblies 26 are configured to direct a spray of fluid onto the upper surface 28 of the rear bumper 18.

The sprayer assembly 200 may be manually operated and/or automatic. Thus, the fluid reservoir 204 or the power source 206 of the sprayer assembly 200 may be in communication with the onboard computing device 38. When operating manually, the sprayer assembly 200 may be operated by engaging the user interface of the input/output hardware 50 or by receiving instruction from a device, such as the mobile computing device 58, via the network 56 or the transceiver 48.

When operating automatically, the onboard computing device 38 may be configured to operate the sprayer assembly 200 when a predetermined condition is satisfied. The predetermined condition may be at least one or a combination of the tailgate 22 being in the closed position, as detected by the sensor 24, the vehicle 10 being started, and the temperature sensor 52 determining that an outside temperature is below or above a predetermined threshold. As a non-limiting example, the onboard computing device 38 may instruct the sprayer assembly 200 to operate upon a vehicle start operation being detected. The onboard computing device 38 may instruct the sprayer assembly 200 to spray fluid onto the upper surface 28 of the rear bumper 18 continuously or intermittently a predetermined number of times, or for a predetermined period of time. In another non-limiting example, the onboard computing device 38 may instruct the sprayer assembly 200 to operate in response to a vehicle start operation being detected and the temperature sensor 52 detecting that the outside temperature is below a predetermined temperature. Actuating the sprayer assembly 200 when the outside temperature is below a predetermined threshold allows the sprayer assembly 200 to melt hard debris such as ice before the tailgate 22 is lowered into the open position.

Figure 6:
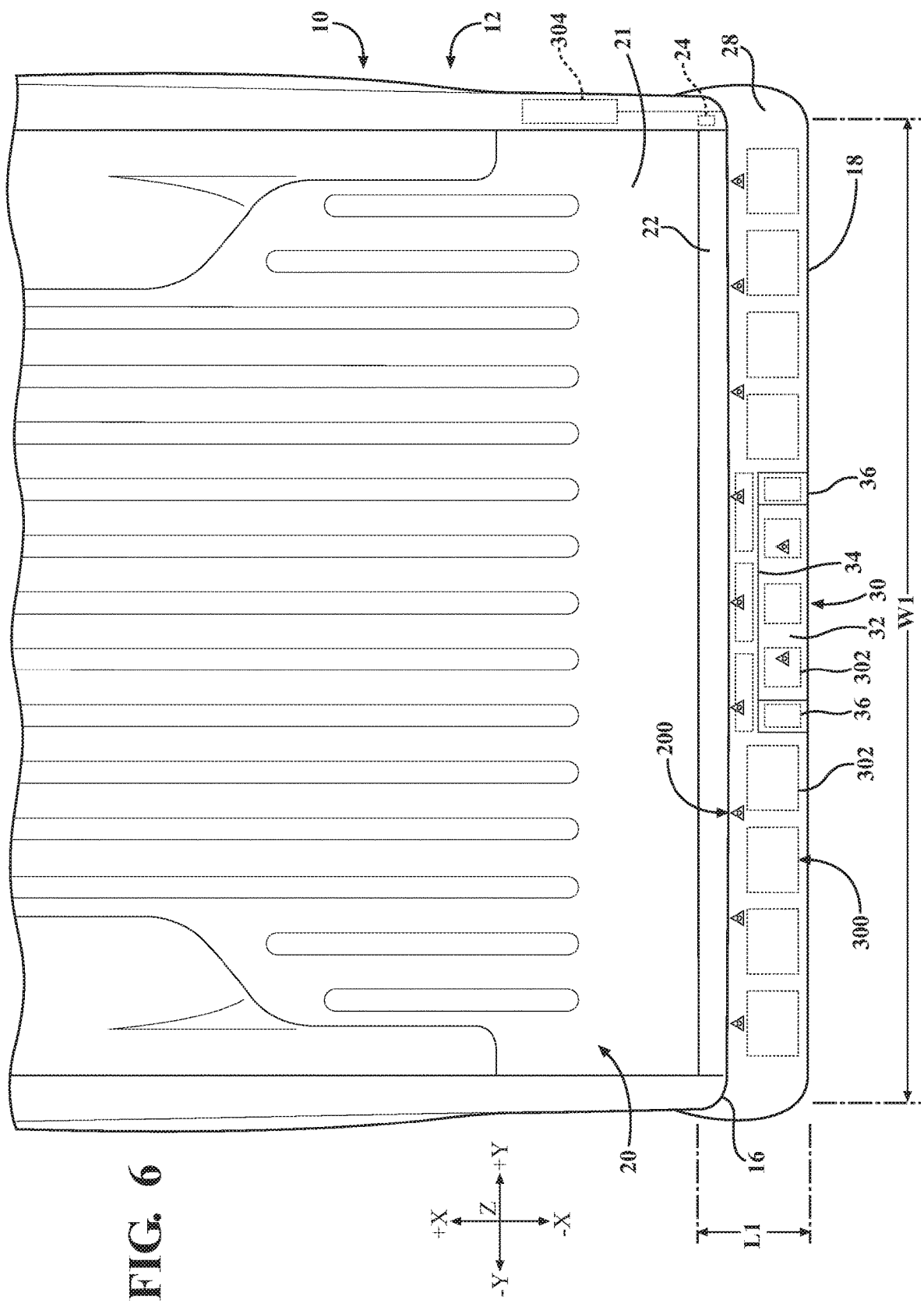
FIG. 6 schematically depicts a partial top view of the vehicle including a plurality of heating pads of the heater assembly according to one or more embodiments shown and described herein.
Figure 7:
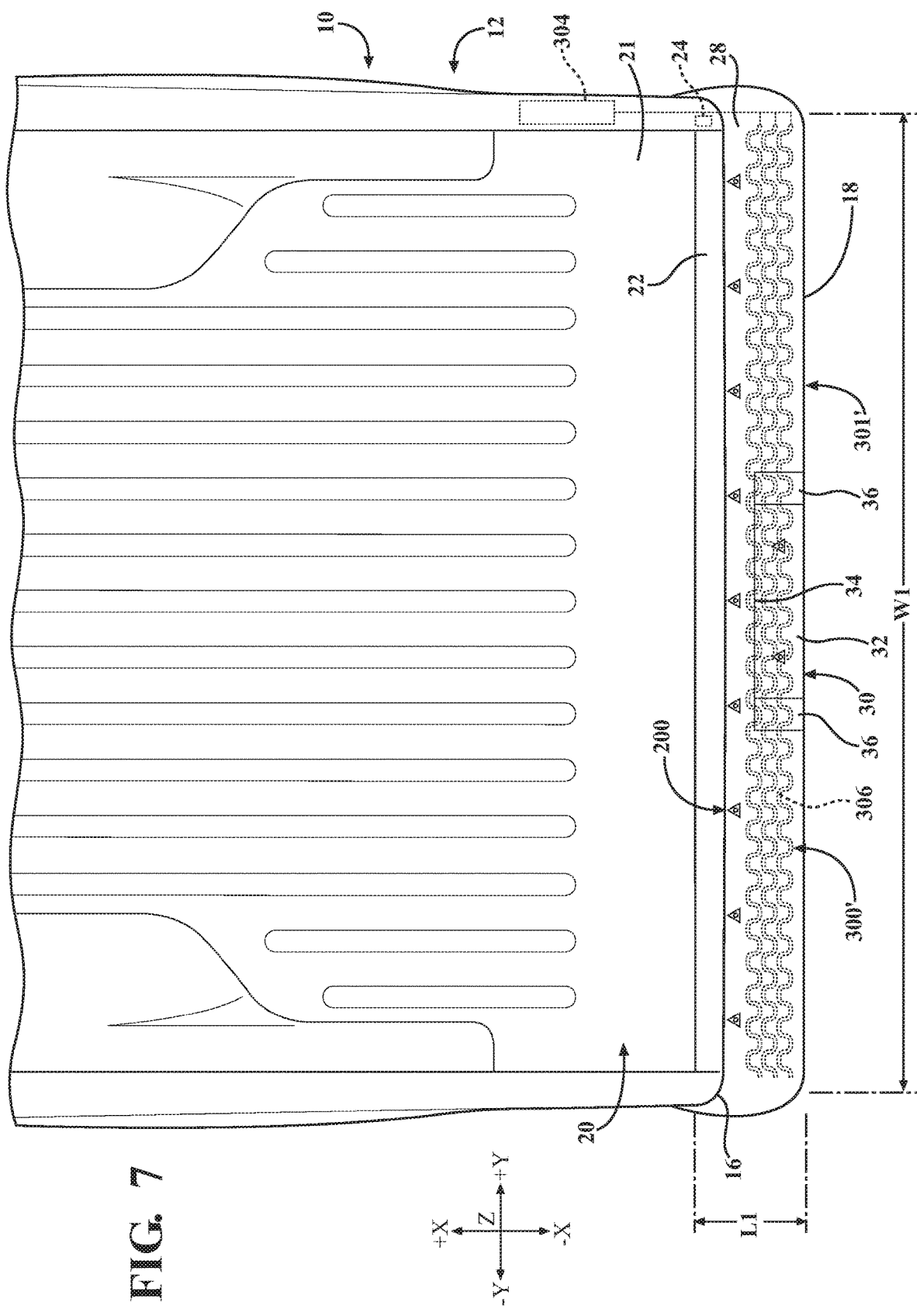
FIG. 7 schematically depicts a partial top view of the vehicle including an alternative embodiment of the heater assembly including a plurality of heating coils according to one or more embodiments shown and described herein.

Referring now to FIGS. 6 and 7, the vehicle 10 is shown including an embodiment of the heater assembly 300. As shown in FIG. 6, an embodiment of the heater assembly 300 includes a heating element 301. In this embodiment, the heating element 301 is a plurality of heating pads 302 electrically connected to a power source 304. It should be appreciated that the power source 304 of the heater assembly 300, such as a battery, may be the same power source used by the sweeper assembly 100, the sprayer assembly 200, if provided, and/or the vehicle 10, or may be a separate power source.

As shown, the heating pads 302 are arranged in a side-by-side manner in the vehicle lateral direction along the entirety of or a substantial portion of the bumper width W1 and the bumper length L1 of the rear bumper 18 to heat substantially an entire portion of the upper surface 28 of the rear bumper 18. The heating pads 302 may be provided below the upper surface 28 of the rear bumper 18 in the vehicle vertical direction or may be embedded within the upper surface 28 of the rear bumper 18. Alternatively, the heating pads 302 may be positioned on top of the upper surface 28 of the rear bumper 18 in the vehicle vertical direction such that individual heating pads 302 may be readily accessible and replaced when necessary for purposes of repair. The heating pads 302 may be any suitable heating device such as, for example, electric heating pads, resistive heating pads, and the like. As shown, the heating pads 302 may be arranged within the step 30, particularly, on top of, under, or embedded within the bottom wall 32, the forward wall 34, and the sidewalls 36 of the step 30.

As shown in FIG. 7, an embodiment of a heater assembly 300' is shown. The heater assembly 300' is similar to the heater assembly 300 except for the fact that the heater assembly 300' includes a heating element 301' in which the heating element 301' is a plurality of heating coils 306 instead of the plurality of heating pads 302. The heating coils 306 may extend along the entirety of or a substantial portion of the bumper width W1 and the bumper length L1 of the rear bumper 18 to heat substantially an entire portion of the upper surface 28 of the rear bumper 18. As shown, the heating coils 306 are provided and arranged parallel to one another. However, it is within the scope of the present disclosure that the heating coils 306 may be arranged in any suitable arrangement such as, for example, a grid formation. The heating coils 306 may be provided below the upper surface 28 of the rear bumper 18 in the vehicle vertical direction or may be embedded within the upper surface 28 of the rear bumper 18. Alternatively, the heating coils 306 may be positioned on top of the upper surface 28 of the rear bumper 18 in the vehicle vertical direction such that individual heating coils 306 may be readily accessible and replaced when necessary for purposes of repair. The heating coils 306 may be any suitable heating device such as, for example, electric heating coils, resistive heating coils, and the like. The heating coils 306 may be arranged within the step 30, particularly, embedded within the bottom wall 32, the forward wall 34, and the sidewalls 36 of the step 30.

Referring to the embodiment of the heater assembly 300 illustrated in FIG. 6, but equally applicable to the embodiment of the heater assembly 300' illustrated in FIG. 7, the heater assembly 300 may be manually operated and/or automatic. The heater assembly 300, specifically the power source 304, may be in communication with the onboard computing device 38. When operating manually, the heater assembly 300 may be operated by engaging the user interface of the input/output hardware 50 or by receiving instruction from a device, such as the mobile computing device 58, via the network 56 or the transceiver 48.

When operating automatically, the onboard computing device 38 may be configured to operate the heater assembly 300 when a predetermined condition is satisfied. The predetermined condition may be at least one or a combination of the tailgate 22 being in the closed position, as detected by the sensor 24, the vehicle 10 being started, and the temperature sensor 52 determining that an outside temperature is below or above a predetermined threshold. As a non-limiting example, the onboard computing device 38 may instruct the heater assembly 300 to operate upon a vehicle start operation being detected. The onboard computing device 38 may instruct the heater assembly 300 to heat the upper surface 28 of the rear bumper 18 for a predetermined period of time. In another non-limiting example, the onboard computing device 38 may instruct the heater assembly 300 to operate in response to a vehicle start operation being detected and the temperature sensor 52 detecting that the outside temperature is below a predetermined temperature. Actuating the heater assembly 300 when the outside temperature is below a predetermined threshold allows the heater assembly 300 to melt hard debris such as ice before the tailgate 22 is lowered into the open position.

As noted hereinabove, the vehicle 10 may include one or a combination of the sweeper assembly 100, the sprayer assembly 200, and the heater assembly 300. As such, the sweeper assembly 100, the sprayer assembly 200, and the heater assembly 300 may be operated in combination with one another. In a non-limiting example, upon a vehicle start operation, the onboard computing device 38 may initially activate the heater assembly 300. Once the heater assembly 300 operates for a predetermined period of time, the onboard computing device 38 may activate the sprayer assembly 200 for a predetermined period of time. The heater assembly 300 may be deactivated prior to activation of the sprayer assembly 200 or the heater assembly 300 and the sprayer assembly 200 may continue simultaneously. After the heater assembly 300 and the sprayer assembly 200 operate for a period of time, any debris remaining on the upper surface 28 of the rear bumper 18 will be softened and/or loosened from the upper surface 28 of the rear bumper 18. Thus, the sprayer assembly 200 may be deactivated and the sweeper assembly 100 may be activated to actuate the push plate 110 between the extended position and the retracted position to push any remaining debris off the upper surface 28 of the rear bumper 18. In some embodiments, the heater assembly 300, the sprayer assembly 200, and the sweeper assembly 100 may be operated simultaneously. It should be appreciated that the above operation of the heater assembly 300, the sprayer assembly 200, and the sweeper assembly 100 is a non-limiting example and each may be operated in conjunction with one another in any other suitable manner not expressly discussed herein.

From the above, it is to be appreciated that defined herein is a vehicle including a system for clearing debris off an upper surface of a rear bumper of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a body having a forward end, a rear end, and a cavity provided therein extending in a vehicle longitudinal direction, the cavity having an opening at the rear end of the body;
   a rear bumper having an upper surface, the rear bumper provided at the rear end of the body of the vehicle; and
   a sweeper assembly including a push plate movable between a retracted position and an extended position, the push plate stored within the cavity of the body when in the retracted position, the push plate extending over the upper surface of the rear bumper when in the extended position to clear debris off the upper surface of the rear bumper.

2. The vehicle of claim 1, wherein the sweeper assembly includes a base member having a forward end and an opposite rear end, and a push plate coupled to the rear end of the base member.

3. The vehicle of claim 2, wherein the push plate is an L-shaped member.

4. The vehicle of claim 2, wherein the push plate conceals the opening of the cavity when in the retracted position.

5. The vehicle of claim 2, wherein the sweeper assembly further comprises a motor and the base member includes a threaded rod at the forward end of the base member, the threaded rod engaging the motor for moving the push plate between the retracted position and the extended position.

6. The vehicle of claim 1, further comprising a tailgate positionable between an open position and a closed position, the sweeper assembly operable to move the push plate into the extended position when the tailgate is in the closed position.

7. The vehicle of claim 1, further comprising an electronic control unit for operating the push plate between the retracted position and the extended position.

8. The vehicle of claim 7, wherein the electronic control unit is configured to operate the push plate between the retracted position and the extended position in response to a vehicle start operation.

9. The vehicle of claim 8, wherein the electronic control unit is configured to operate the push plate between the retracted position and the extended position after the vehicle start operation for a predetermined period of time.

10. The vehicle of claim 8, wherein the electronic control unit is configured to operate the push plate between the retracted position and the extended position after the vehicle start operation when an outside temperature is above a predetermined threshold.

11. The vehicle of claim 1, further comprising input/output hardware, the sweeper assembly being manually operated by utilizing the input/output hardware.

12. The vehicle of claim 1, wherein the rear bumper has a bumper width and a bumper length, and the push plate has a push plate width and a push plate length, the push plate width and the push plate length being equal to the bumper width and the bumper length.

13. The vehicle of claim 2, wherein the sweeper assembly further comprises a pair of motors provided on opposite sides of the body of the vehicle, each of the pair of motors threadedly engaging a forward end of the base member, the pair of motors operating to move the push plate between the retracted position and the extended position.

* * * * *